United States Patent [19]

Hösel

[11] Patent Number: 4,562,358
[45] Date of Patent: Dec. 31, 1985

[54] ELECTRONIC PRESSURE RESPONSIVE SWITCH

[75] Inventor: Fritz Hösel, Monchen-Gladbach, Fed. Rep. of Germany

[73] Assignee: Trützschler GmbH & Co. KG, Monchen-Gladbach, Fed. Rep. of Germany

[21] Appl. No.: 466,321

[22] Filed: Feb. 14, 1983

[30] Foreign Application Priority Data

Feb. 12, 1982 [DE] Fed. Rep. of Germany ....... 3204881

[51] Int. Cl.⁴ .............................................. H01H 35/24
[52] U.S. Cl. .................................. 307/118; 361/177; 361/179; 200/81.4; 200/83 R
[58] Field of Search ................ 307/118, 132 EA, 144, 307/117; 200/81.4, 83 N, 83 P, 83 S, 83 W; 250/231 P; 361/174–179, 181, 180; 19/300

[56] References Cited

U.S. PATENT DOCUMENTS

| | | | |
|---|---|---|---|
| 3,530,341 | 9/1966 | Hutchinson | 361/177 |
| 3,761,958 | 9/1973 | Nishira | 338/36 |
| 3,898,454 | 8/1975 | Friday et al. | 250/231 P |
| 4,014,213 | 3/1977 | Parquet | 200/83 W X |
| 4,211,935 | 7/1980 | Erben | 307/118 |
| 4,240,180 | 12/1980 | Wood et al. | 19/300 |
| 4,359,646 | 11/1982 | Mejia et al. | 307/116 |
| 4,404,710 | 9/1983 | Wood | 19/300 X |

FOREIGN PATENT DOCUMENTS

| | | |
|---|---|---|
| 2157331 | 6/1972 | Fed. Rep. of Germany . |
| 8100274 | 2/1981 | Int'l Pat. Inst. . |
| 1231705 | 5/1971 | United Kingdom . |
| 1538228 | 1/1979 | United Kingdom . |
| 1604625 | 12/1981 | United Kingdom . |

OTHER PUBLICATIONS

Rueger, W. J., Pneumatic Switch, IBM Technical Disclosure Bulletin, vol. 10, No. 8, Jan. 1968; 1109–1110.

Primary Examiner—G. P. Tolin
Assistant Examiner—Todd E. DeBoer
Attorney, Agent, or Firm—Spencer & Frank

[57] ABSTRACT

An electronic pressure responsive switch comprises an activating element and at least two sensors. The activating element and the sensors are arranged to be relatively displaceable with respect to one another whereby the sensors each generate signals when the activating element assumes a predetermined position relative to a respective sensor. The switch further has an elastic diaphragm having a first face exposed to pressure to be sensed and a reverse second face carrying either the activating element or the sensors. The diaphragm is deformable by the pressure whereby the relative position between the activating element on the one hand and the sensors on the other hand is varied as a function of the pressure.

8 Claims, 23 Drawing Figures

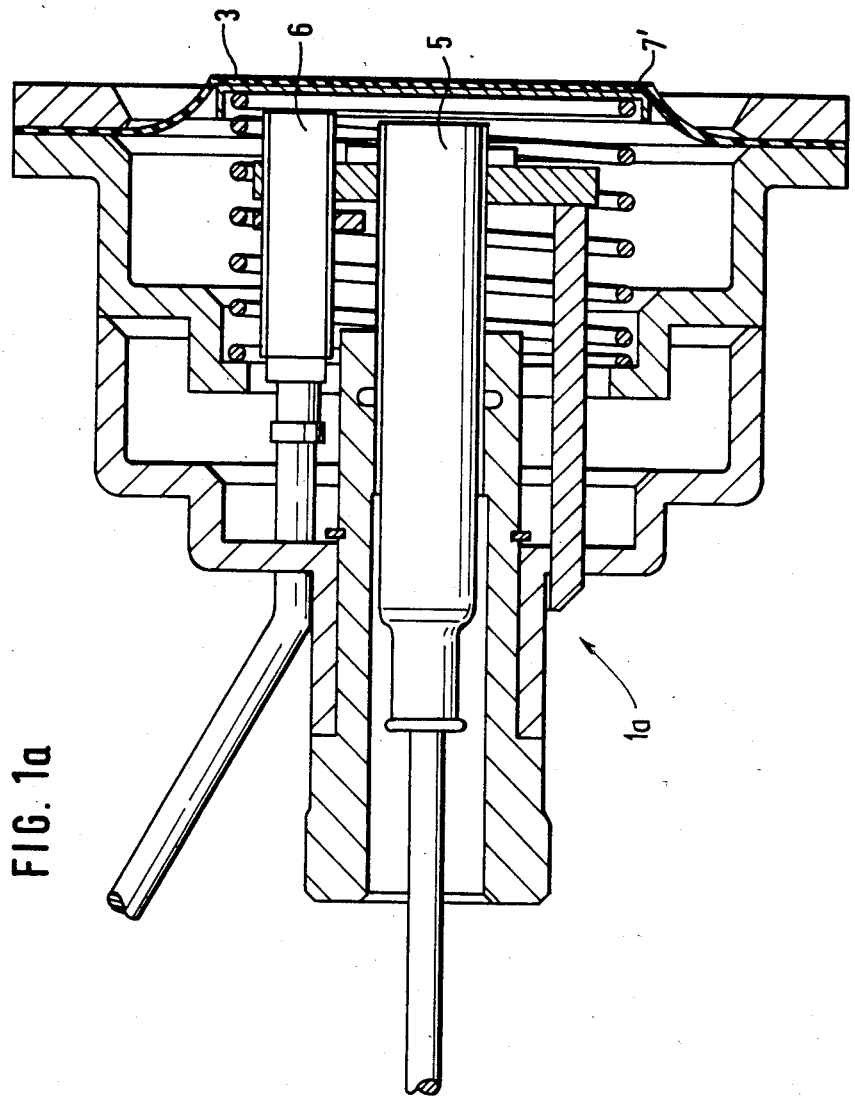

ELECTRONIC PRESSURE RESPONSIVE SWITCH

BACKGROUND OF THE INVENTION

This invention relates to an electronic pressure responsive switch that can find particular application as a measuring member for sensing pressure fluctuations in textile machines. The pressure responsive switch is provided with a sensor component such as a proximity sensor (proximity switch member), an elastic diaphragm and an activating element adapted to move into the effective range of the sensor component.

U.S. Pat. No. 4,211,935 issued July 8th, 1980 discloses an electronic pressure responsive switch that comprises an axially displaceable electronic proximity sensor (proximity switch member), a metal plate-equipped diaphragm oriented perpendicularly to the axis of and arranged spaced from, the proximity sensor. The pressure responsive switch according to the patent further has a compression spring which is arranged coaxially about the proximity sensor and has an end which engages the metal plate. In a pressure responsive switch of this type, with increasing outer pressure applied against the metal plate-equipped diaphragm the compression spring yields so that upon reaching a predetermined setting pressure the metal plate enters into the operational (switching) zone of the electronic proximity sensor. Upon this occurrence, the thyristor forming part of the proximity sensor fires and applies a voltage to the output of the switch. As the pressure drops below a predetermined switch-on pressure, the thyristor opens, and as a result, the voltage at the switch output disappears. The electronic pressure responsive switch is a component of a regulating system in which the diaphragm forms the measuring member and the electronic proximity sensor forms the regulator of the system. It is a drawback of the above-outlined electronic pressure responsive switch that solely a two-point regulation may be effected therewith, that is, for example, in case of exceeding or dropping below a certain predetermined pressure, on-switching or off-switching takes place.

SUMMARY OF THE INVENTION

It is an object of the invention to provide an improved electronic pressure responsive switch of the above-outlined type with which a more than two-point regulation is possible and wherein such regulation is achieved by simple structural means.

This object and others to become apparent as the specification progresses, are accomplished by the invention, according to which, briefly stated, there are provided at least two sensors on the same side of the diaphragm and that each sensor is associated with at least one activating element.

By means of the invention as outlined above, it is feasible to provide, in a pressure dependent control system, an electronic pressure responsive switch with more than two switching points. The pressure responsive switch according to the invention may be of robust structure, it can operate with a high switching frequency and is insensitive to dust. As sensor members, for example, inductive proximity sensors, optical barriers, light diodes (infrared photocells), supersonic sensors and the like may be used.

BRIEF DESCRIPTION OF THE DRAWING

FIG. 1a is a schematic axial view of another preferred embodiment of the invention.

DESCRIPTION OF THE PREFERRED EMBODIMENTS

Figure 1:
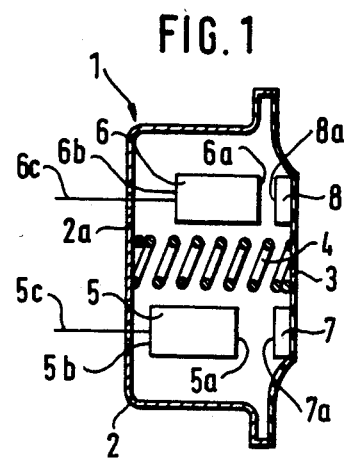
FIG. 1 is a schematic axial view of a preferred embodiment of the invention.

Turning now to FIG. 1, there is shown a preferred embodiment of an electronic pressure responsive switch 1 according to the invention, having a rotationally symmetrical housing 2, one face of which is closed off by a diaphragm 3 made, for example, of rubber. Between the diaphram 3 and a rear wall 2a of the housing 2 there is arranged a compression spring 4 engaging the inner face of the diaphragm 3. Within the housing 2 there are provided two proximity switch members 5 and 6 which function as sensors and which may be, for example, of the inductive type. On the inner face of the diaphragm 3 there are provided, as activating elements, two metal plates 7 and 8 which are coaxial with respect to the proximity sensors 5 and 6. The diaphragm 3 is at different distances from the end faces 5a and 6a of the respective proximity sensors 5 and 6, while the diaphragm 3 is equidistantly arranged with respect to the frontal faces 7a and 8a of the respective metal plates 7 and 8. To the sides 5b and 6b of the respective proximity sensors 5 and 6 there are connected respective terminal wires 5c and 6c which are brought to the outside of the rear wall 2a of the housing 2. The proximity sensors 5 and 6 are axially displaceable, whereby the tolerance field between the end faces 5a and 7a as well as 6a and 8a may be increased or decreased. In the embodiment illustrated in FIG. 1a, the pressure responsive switch 1a has a single activating element formed of a metal plate 7' which serves both sensors 5 and 6. The activating element 7' is mounted on the inner face of the diaphragm 3.

Figure 2:
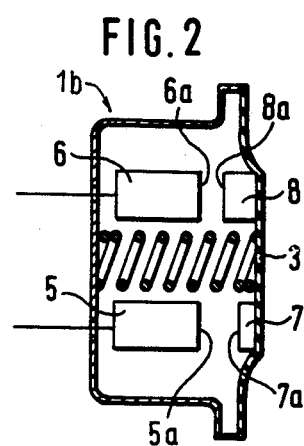
FIG. 2 is a schematic axial view of still another preferred embodiment of the invention.

Turning now to the embodiment illustrated in FIG. 2, the switch 1b has a diaphragm 3 which is at the same distance from the end faces 5a and 6a of the respective proximity sensors 5 and 6, but which is at different distances from the end faces 7a and 8a of the metal plates 7 and 8.

Figure 3:
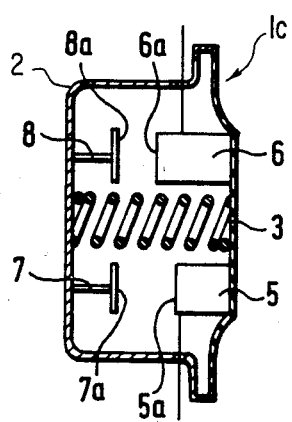
FIG. 3 is a schematic axial view of a further preferred embodiment of the invention.

Turning now to the embodiment illustrated in FIG. 3, the proximity sensors 5 and 6 of the switch 1c are mounted on the diaphragm 3 whereas the activating elements 7 and 8 are secured to the housing 2. The diaphragm 3 is at different distances from end faces 5a and 6a of the proximity sensors 5 and 6, whereas the diaphragm 3 is equidistantly spaced from the end faces 7a and 8a of the respective activating elements 7 and 8.

Figure 4:
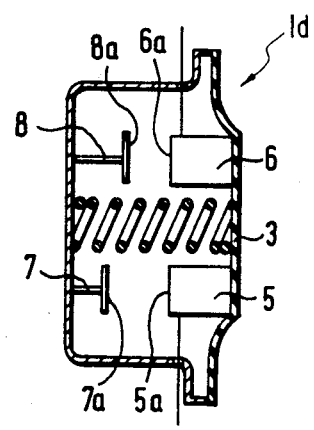
FIG. 4 is a schematic axial view of still another preferred embodiment of the invention.

Turning now to FIG. 4, in the embodiment shown therein, the switch 1d differs from the FIG. 3 embodiment in that the diaphragm 3 is equidistantly spaced from the end faces 5a and 6a of the proximity switch members 5 and 6, whereas the diaphragm 3 is at different distances from the end faces 7a and 8a of the respective activating elements 7 and 8.

Figure 5:
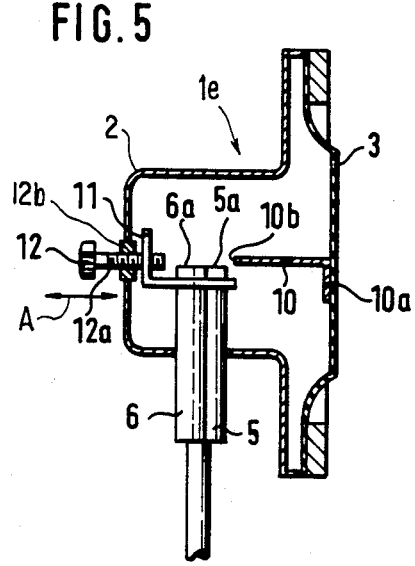
FIG. 5 is a schematic axial view of a further preferred embodiment of the invention.

Turning now to the embodiment illustrated in FIG. 5, there is shown an electronic pressure responsive switch 1e in which the longitudinal axes of the proximity sensors 5 and 6 are parallel to the plane of the diaphragm 3. The activating element 10 is oriented perpendicularly to the diaphragm 3 and to the longitudinal axes of the proximity sensors 5 and 6 and is secured at its end 10a to the inside face of the diaphragm 3. The other end 10b of the activating element 10 is adapted to penetrate into the operational range of the end faces 5a and 6a of the respective proximity sensors 5 and 6, dependent upon the magnitude of the pressure exerted on the outer face of the diaphragm 3. In this manner the proximity sensors 5 and 6 are actuated as a function of the pressure. The proximity sensors 5 and 6 are mounted on an adjusting bracket 11 coupled to a setting mechanism 12 which is supported in the switch housing 2. The setting mechanism 12 is provided with a fine pitch winding 12a received in a complementally threaded sleeve 12b whereby the basic distance between the diaphragm 3 and the proximity sensors 5 and 6 may be altered as indicated by the arrow A.

Figure 6:
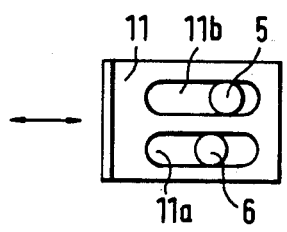
FIG. 6 is a schematic top plan view of one part of the structure shown in FIG. 5.

Turning now to FIG. 6, the adjusting bracket 11 has two securing slots 11a and 11b for the respective proximity sensors 5 and 6. Dependent upon the arrangement of the proximity sensors 5 and 6 in the adjusting bracket 11, the pressure threshold at which switching should occur, may be varied or, as the case may be, can be determined in advance as a fixed value.

In the description which follows, the operation of the pressure responsive switch according to the invention will be set forth with reference to FIGS. 7a, 7b and 7c.

It is assumed at the outset that the pressure responsive switch is to effect a pressure-dependent motor control by means of the following three pressure-dependent switching states: (a) the motor is deenergized; (b) the motor runs slow and (c) the motor runs fast.

Figure 7A:
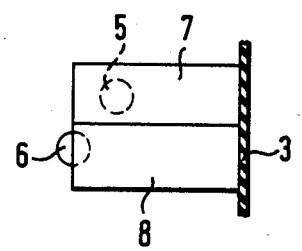
FIGS. 7a, 7b and 7c are schematic top plan views of a component of the FIG. 5 structure, depicting different switching stages.

As shown in FIG. 7a, both proximity sensors 5 and 6 are actuated since, by virtue of a deflection of the diaphragm 3 to a certain position in response to a particular external pressure, activating members 7 and 8 have both entered in the operational zone of the respective proximity sensors 5 and 6. This condition results in a deenergization of the motor controlled by the pressure responsive switch. In the switching state illustrated in FIG. 7b only the proximity sensor 5 is activated, resulting in a slow run of the motor. In the position shown in FIG. 7c, neither the proximity sensor 5 nor the proximity sensor 6 is activated, this results in a fast run of the motor.

Figure 8:
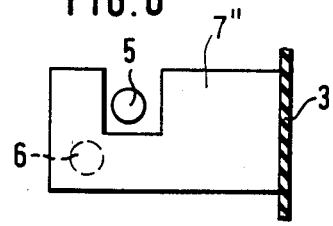
FIG. 8 is a schematic view of a variant of the component shown in FIGS. 7a through 7c.

By means of the distance between the proximity sensors 5 and 6, it can be determined exactly at what pressure should the motor be switched to slow run or switched off. By means of an adjusting mechanism, such as the adjusting bracket 11 and the setting device 12 of the FIG. 5 embodiment, the basic distance between sensor and activating element may be changed synchronously, that is, the pressure value at which switching occurs may be varied. If it is required to include a fourth switching point in the system with which the electronic pressure responsive switch according to the invention is associated, an apertured activating element is designated at 7" in FIG. 8 is advantageously used. In principle, with such a structure a desired number of switching points may be achieved in accordance with the formula $n = 2^x$, where n is the number of switching points and x is the number of sensors. The evaluation of the signals transmitted by the sensors is performed by simple electronic circuitry known by itself. It is feasible to include in such circuit desired time-delay components so that a "fluttering" is suppressed to thus prevent a continuous back-and-forth switching between slow and fast motor run.

Figure 9:
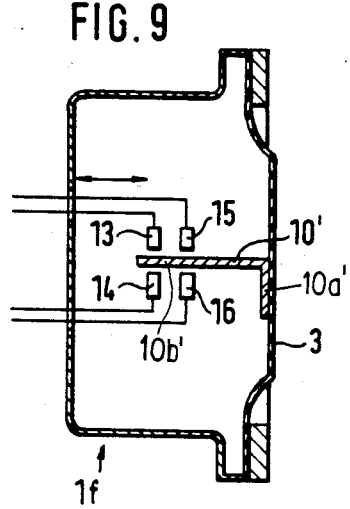
FIG. 9 is a schematic axial view of still another preferred embodiment of the invention.

Turning now to FIG. 9, there is shown a preferred embodiment of the electronic pressure responsive switch designated at 1f which comprises two light barriers functioning as sensors. One light barrier (optical sensor) comprises a transmitter 13 and a receiver 14 while the other light barrier comprises a transmitter (light source) 15 and a receiver (detector) 16. The axis between the transmitter and the receiver of each light barrier extends parallel to the plane of the diaphragm 3. An activating element 10' extends perpendicularly to the diaphragm 3 and is affixed to the inner face thereof by means of an end 10a'. The other end 10b' may be placed in an active or inactive position between one or both optical barriers dependent upon the magnitude of pressure exerted on the outer face of the diaphragm 3.

Figure 10:
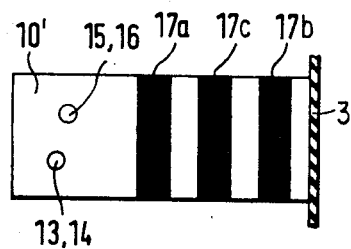
FIG. 10 is a schematic view of a component of the FIG. 9 structure.

FIG. 10 illustrates the structure of the activating element 10'. It essentially comprises a transparent rectangular plate member provided with spaced opaque strips 17a, 17b and 17c extending transversely to the direction of displacement of the activating member as the diaphragm 3 undergoes deformation in response to an external pressure applied thereto. Dependent upon the shifted position of the activating member 10', the light beam between transmitters and receivers of the respective optical barriers is interrupted or allowed to pass, whereby the respective optical barriers generate "light" or "dark" signals in a predetermined pattern. In the embodiment shown in FIG. 10 the diaphragm 3 is at different distances from the two optical barriers 13, 14 and 15, 16 whereas the diaphragm 3 is at the same distance from any one of the opaque strips 17a, 17b and 17c.

Figure 11A:
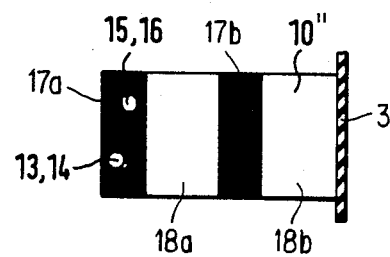
FIGS. 11a, 11b and 11c are schematic top plan views of a component of the FIG. 9 structure, depicting different switching stages.
Figure 11B:
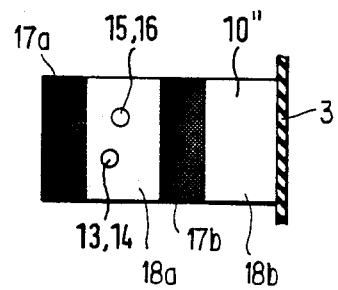
Figure 11C:
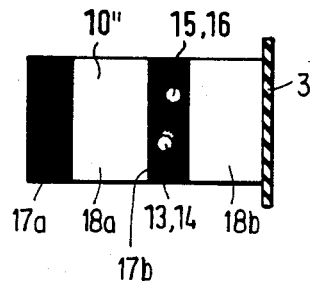

Turning now to FIGS. 11a, 11b and 11c, there is illustrated the structure of a modified activating member 10" of the embodiment illustrated in FIG. 9. The activating element 10" comprises a transparent rectangular carrier which has two opaque fields 17a and 17b with alternating clear (transparent) fields 18a, 18b in between. It is noted that the alternating light and dark fields may be obtained by using a black-and-white film strip replaceably sandwiched between two transparent plates. As it may be observed in comparing the various positions of the activating member 10" in respective FIGS. 11a, 11b and 11c, the light beams between the transmitter and the receiver of the respective optical barriers may be interrupted or allowed to pass through. The signals generated by the respective optical barriers dependent upon the position of the activating member 10" is evaluated in a circuitry shown, for example, in FIG. 14, as will be described later as the specification progresses. By the widths of the fields the desired switching points may be predetermined. By means of an externally accessible setting device the optical barriers 13, 14 and 15, 16 can be displaced (adjusted) as a unit, so that the entire pressure level in which the switching points should lie may be set. Each transition from a transparent field to an opaque field, and conversely, represents a switching point. The smaller the distance between the fields on the activating element 10", the more switching points may be obtained. The optical barriers 13, 14 and 15, 16 are of different distances from the diaphragm 3 in FIGS. 10, 11a, 11b and 11c so that the electronic evaluating circuit associated with the optical barriers is capable of recognizing a direction of displacement (forwards or rearwards displacement recognition) to thus sense an increasing or decreasing pressure. Transitions (from light to dark and from dark to light) which are counted and which, because of the positioning of the light barriers, cannot occur simultaneously, are decisive for the direction detection.

The different operating states corresponding to FIGS. 11a through 11c (such as de-energized, slow and fast states) are effected as a result of evaluating the transitions (from light to dark and conversely). Although, for example, light barriers 13, 14 and 15, 16 in FIGS. 11a through 11c are disposed in a dark field, the number of transitions to reach these dark fields is different.

Figure 7B:
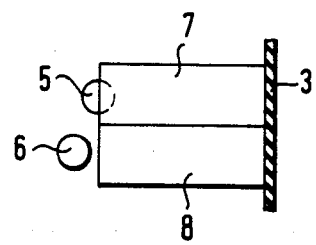
Figure 7C:
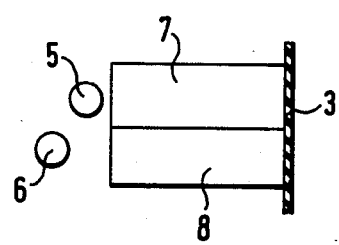

The embodiment shown in FIGS. 11a, 11b and 11c can, similarly to the embodiment according to FIGS. 7a, 7b and 7c operate with three switching points. Thus, in the position shown in FIG. 11a, the motor is switched off, in the position shown in FIG. 11b the motor runs slow and in the position shown in FIG. 11c the motor runs fast.

Figure 12:
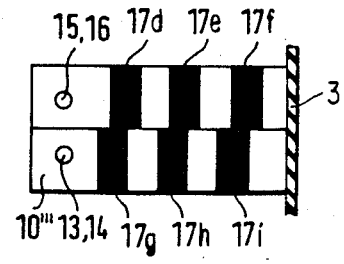
FIG. 12 is a schematic top plan view of a variant of the component shown in FIGS. 11a through 11c.

FIG. 12 shows another modified activating element 10''' wherein the diaphragm 3 has the same distance from the two light barriers 13, 14 and 15, 16 but wherein the diaphragm 3 is at different distances from the associated opaque fields 17d through 17i.

Figure 13:
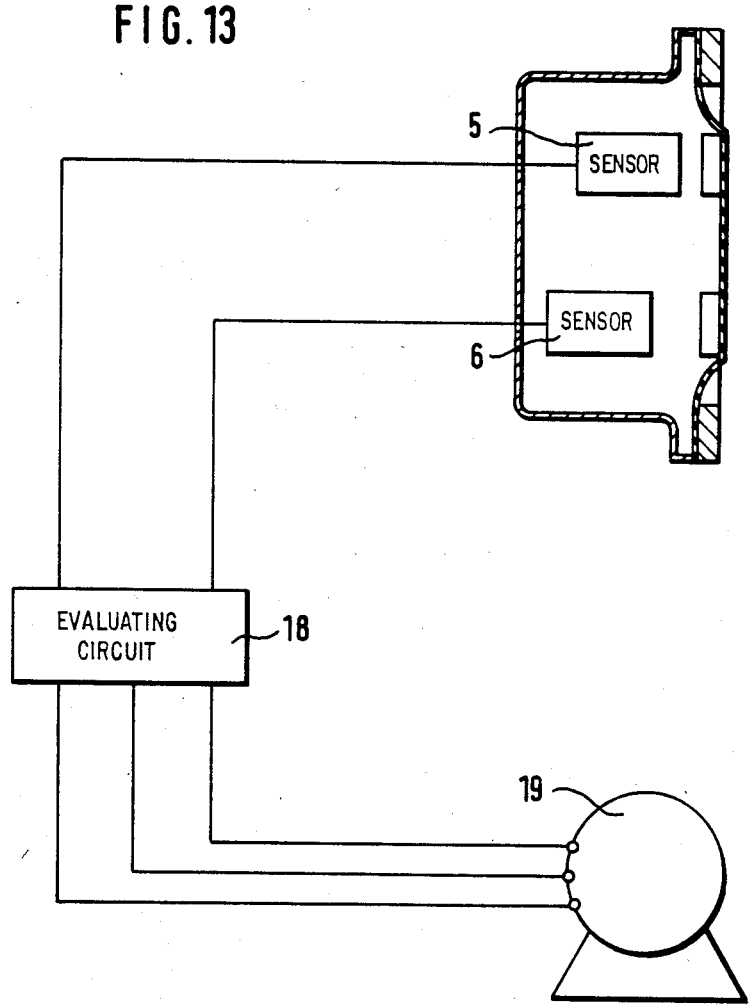
FIG. 13 is a block diagram illustrating the invention incorporated in a control circuit.

Turning now to FIG. 13, the two sensors 5 and 6 of the switch 1 of FIG. 1 are connected to the inputs of an evaluating circuit 18 which may have electric elements such as relays, amplifiers or the like. The outputs of the circuit 18 are connected to a pole-reversible asynchronous motor 19 which has three possible operational states, namely OFF, fast run and slow run states. The circuit 18 may also be used, for example with a switch according to the FIG. 5 embodiment.

Figure 14:
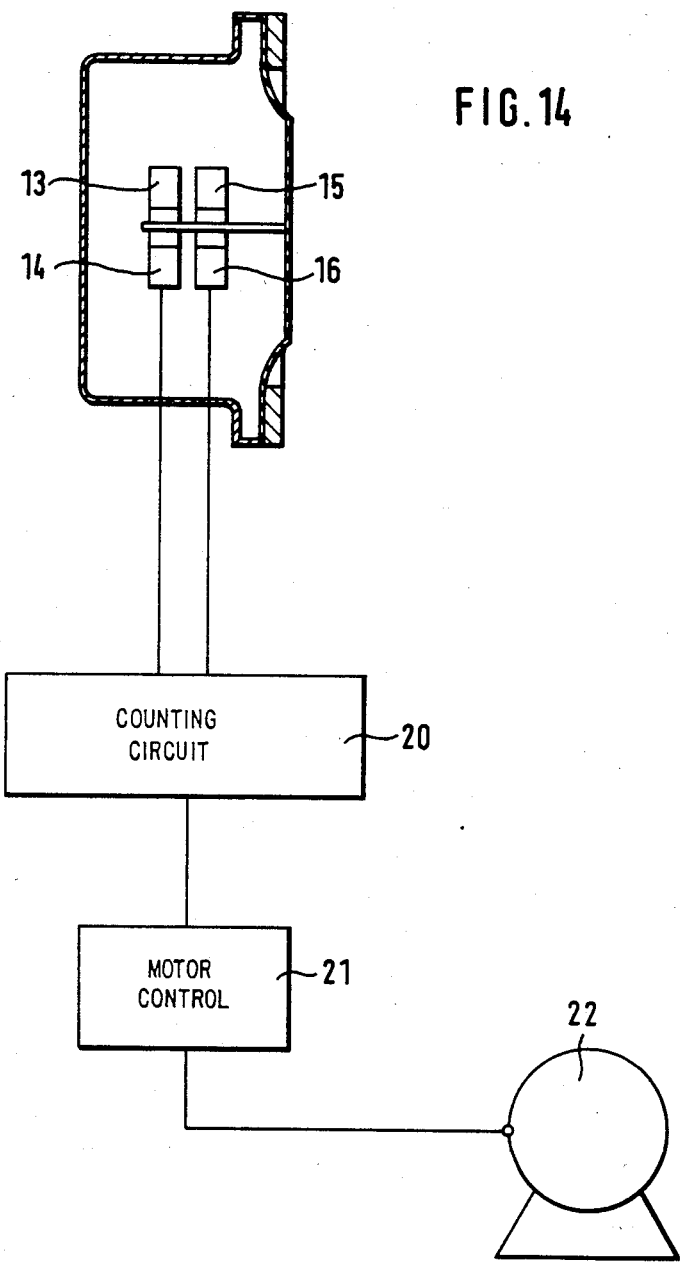
FIG. 14 is a block diagram illustrating the invention incorporated in a different type of control circuit.

Turning now to FIG. 14, the two optical barriers 13, 14 and 15, 16 of the FIG. 9 embodiment are connected to inputs of an electronic counting circuit 20 which in turn is connected to an electronic motor control 21 which may be a SIMOREG model, manufactured by Siemens AG, Munich, Federal Republic of Germany. The motor control 21 is, in turn, coupled to a d.c. motor 22. With the circuitry shown in FIG. 14 it is feasible to assign in a simple manner predetermined time periods to the switching points whereby desired hysteresis conditions can be obtained. In this manner a "flutter" effect, such as a continuous back-and-forth switching between slow run and fast run is prevented.

Figure 15:
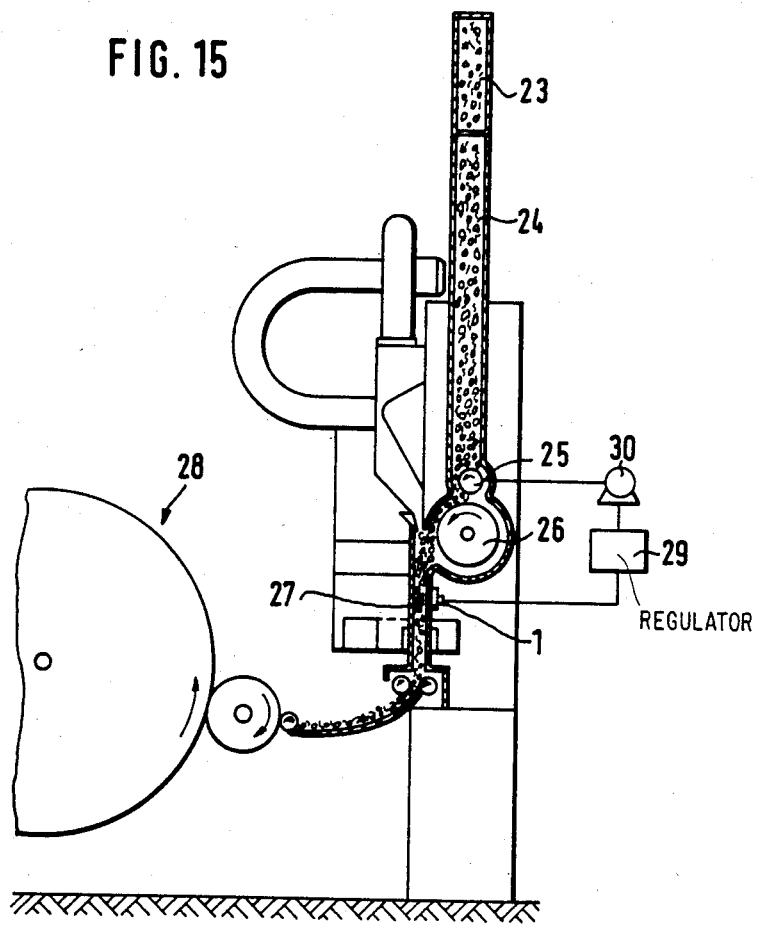
FIG. 15 is a schematic side elevational view illustrating the invention incorporated in a pneumatic fiber tuft supply apparatus.

FIG. 15 illustrates a textile machine combined with the electronic pressure responsive switch according to the invention. Thus, as shown in FIG. 15, textile fiber tufts are introduced from a fine opener by means of a supply and distributor duct 23 into an upper reserve chute 24. From the reserve chute 24 the fiber tufts are admitted to a feed roller 25 and an opening roller 26 which advance the material to a lower feed chute 27. The feed chute 27 supplies the textile fiber tufts as a fiber lap to a carding machine generally designated at 28. On a wall of the lower feed chute 27 there is mounted the electronic pressure responsive switch according to the invention (for example, the switch 1 according to the FIG. 1 embodiment). The switch 1 is operatively connected, by means of a regulator 29, with the drive motor 30 of the feed roller 25. During operation, the electronic pressure responsive switch measures the pressure in the lower feed chute 27. From the measured pressure an electric signal is derived which represents a regulating magnitude. The signal generates, by means of the regulator 29, a setting signal which is applied to the motor 30 of the feed roller 25. By varying the rpm of the feed roller 25 as a function of the pressure fluctuations in the feed chute 27 (multipoint regulation), the flow rate of the fiber tuft in the feed chute 27 is altered.

Figure 16:
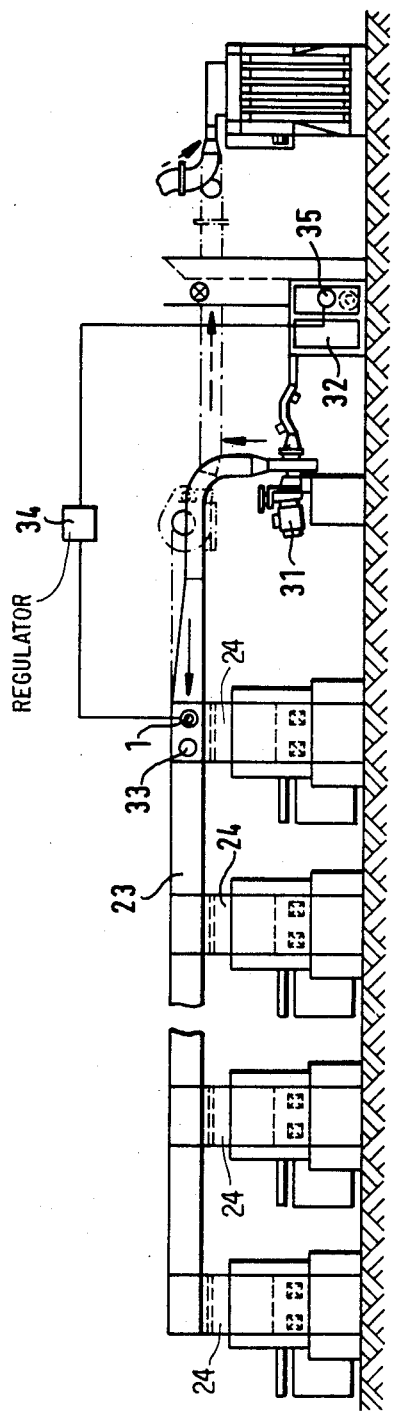
FIG. 16 is a schematic side elevational view illustrating the invention incorporated in a conveying duct which advances fiber tuft to a pneumatic tuft feeding system.

Turning now to FIG. 16, there is shown in schematic side elevation a fiber tuft feeding system. The intake side of a tuft propelling fan 31 is connected to a fine opener 32. To the pressure side of the fan 31 there is connected the supply and distributor duct 23 which is arranged above the reserve chutes 24 of a series of fiber tuft feeding apparatuses of the type shown in FIG. 15. The electronic pressure responsive switch 1 according to the invention is mounted on the wall of the distributor duct 23, above the first reserve chute 24, as viewed from the impeller 31. The fan 31 draws the opened fiber material from the last beater station of the fiber opening system, for example, from the fine opener 32 and delivers the material by means of conveying air stream in the supply and distributor duct 23 to the reserve chutes 24 of the adjoining card feeding apparatuses. Upon entrance of the tuft-air mixture into the reserve chutes 24, the air escapes through conveying air outlet openings (not shown) such as a filter and the tufts are delivered into the reserve chutes 24 where they form tuft columns. As the tuft columns begin to rise and thus begin to cover the transport air outlet filter, the pressure in the supply and distributor duct 23 increases. This pressure increase continues as the column height in the reserve chutes 24 increases and eventually attains its maximum value which corresponds to the preselected switching pressure when the transport air outlet filters are entirely covered by the fiber tuft column in all the reserve chutes 24.

At the beginning (upstream end) of the supply and distributor duct 23, above the first reserve chute 24, there are arranged a fine pressure sensor 33 to indicate the pressure in atmospheres and the electronic pressure responsive switch 1 for switching the material supply on or off or switching from one speed to another at which the tuft material travels from the fine opener 32 to the fan 31. The electronic pressure responsive switch 1 is set to a predetermined speed switchover and switch-off pressure. If these pressures are reached during operation, the material feed from the fine opener 32 is switched to slow run or is switched off altogether. In this manner, the fiber supply to the fan 31 is decreased or shut off. The fan 31 remains in operation and, if supply shutoff has occurred, it drives exclusively air into the supply and distributor duct 23 and maintains the pressure conditions therein. As the feed chutes 27 need additional material, fiber tuft is drawn by the feed rollers 25 from the reserve chutes 24. Thus, the fiber tuft columns in the reserve chutes 24 are gradually depleted. As a result, the transport air outlet filters gradually are freed and consequently the pressure in the duct drops. As the pressure drop reaches the switching point pressure values preset in the electronic pressure responsive switch 1, the tuft delivery from the fine opener 32 is again switched on or switched over from a slow run to a fast run. As a result, the fan resumes delivery or increases delivery of fiber material to the reserve chutes 24.

The electronic pressure responsive switch 1 is connected with an electric drive motor 35 with the intermediary of a regulator 34 which may include a time relay. The drive motor 35 rotates an opening roller, such as a Kirschner beater, in the fine opener 32 by means of a settable gear drive (not shown).

In the examples described in connection with FIGS. 15 and 16, the electronic pressure responsive switch 1 affects the feed roller 25 (FIG. 15) or the fine opener 32 (FIG. 16) of a cleaning line. As an alternative, the electronic pressure responsive switch 1 may affect other setting members of the cleaning line to vary the delivered quantity of the fiber tufts. The electronic pressure responsive switch 1 may find application in any fiber tuft feed system for textile machines; it may be used, for example, in a box feeder for beaters, such as a Pneumafeeder model, manufactured by Trützschler GmbH, Mönchengladbach, Federal Republic of Germany.

Figure 17:
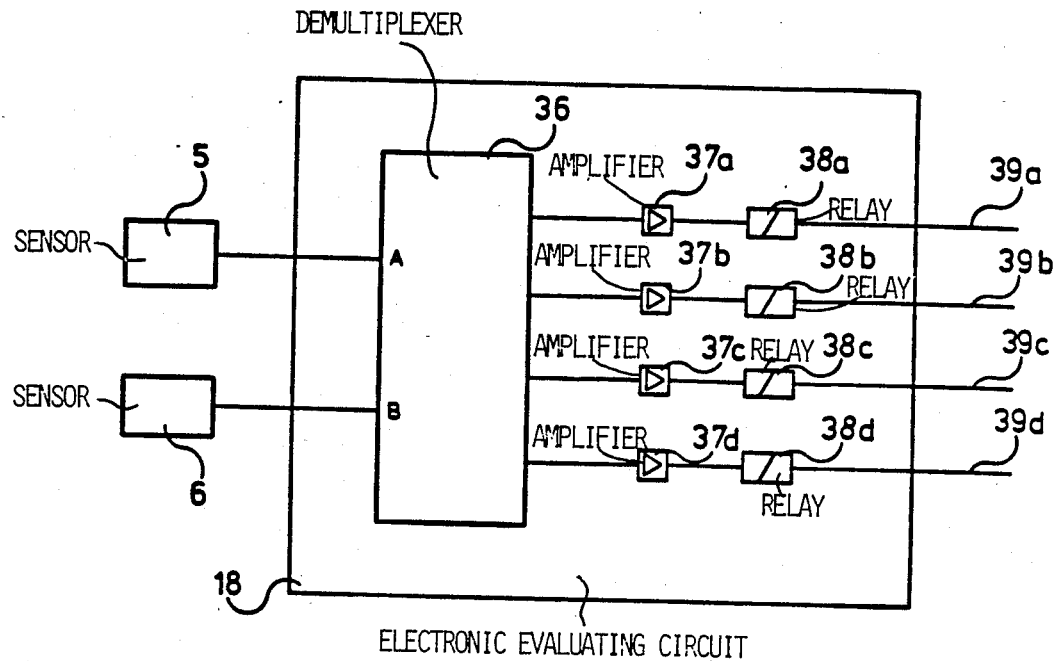
FIG. 17 is a block diagram showing further details of the control circuit of FIG. 13.

Turning now to FIG. 17, there is shown a schematic representation of the structure of the electronic evaluating circuit 18 of FIG. 13. Sensors 5 and 6 are connected with a demultiplexer 36, e.g. type 74 C 154 made by National Semiconductor Corporation. Each one of the outputs of demultiplexer 36 is connected with one of amplifiers 37a, 37b, 37c and 37d and the latter are connected with respective relays 38a, 38b, 38c and 38d. Conductors 39a, 39b, 39c and 39d extending from evaluating circuit 18 form four switching points.

Figure 18:
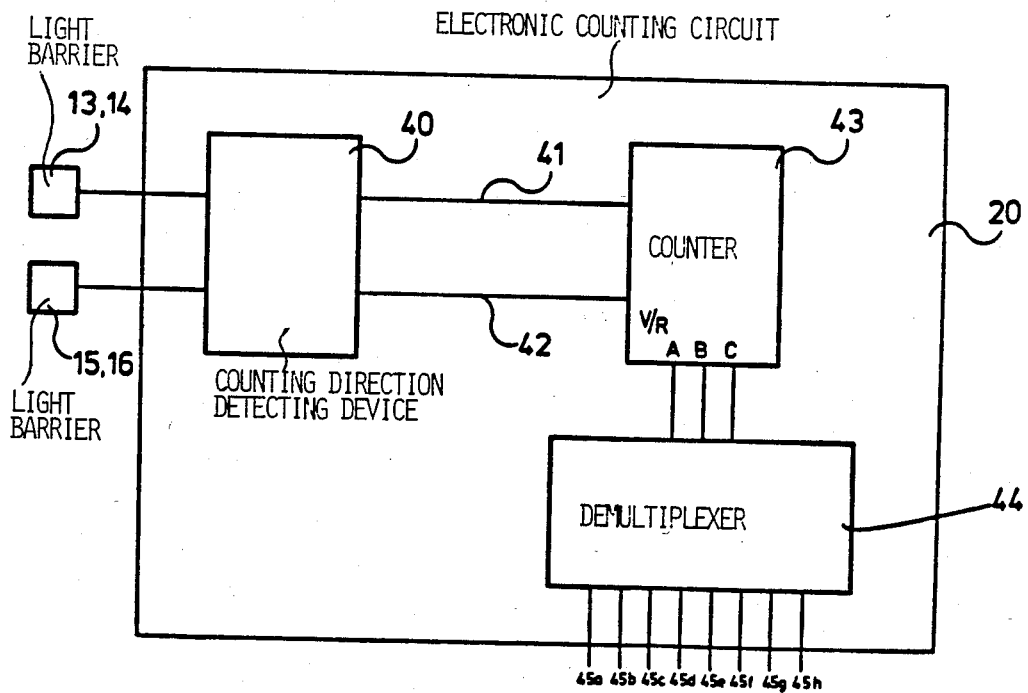
FIG. 18 is a block diagram showing further details of the control circuit of FIG. 14.

FIG. 18 is a schematic representation of the structure of the electronic counting circuit 20 of FIG. 14. The light barriers 13, 14 and 15, 16 are connected with a known counting direction detecting device 40 from which leads a conductor 41 for the counting pulse and a conductor 42 for the counting device of a counter 43. The latter is connected by three conductors with a demultiplexer 44 which may be of the same type as the demultiplexer 36. Conductors 45a through 45h extending from demultiplexer 44 form eight switching points. The cable shown in FIG. 14 between counting circuit 20 and control device 21 may have, for example, eight conductors.

It will be understood that the above description of the present invention is susceptible to various modifications, changes and adaptations, and the same are intended to be comprehended within the meaning and range of equivalents of the appended claims.

What is claimed:

1. An electronic pressure responsive switch sensing pressure fluctuations in a textile machine, comprising
    (a) an elastic diaphragm having a first face exposed to pressure to be sensed and a reverse, second face; said diaphragm defining a first side toward which said first face is oriented and a second side towards which said second face is oriented; said diaphragm being deformable by said pressure;
    (b) an activating means comprising a metal plate affixed face-to-face to said second face of said diaphragm; said diaphragm and said metal plate being displaceable together as a function of said pressure; and
    (c) sensor means for generating sensor signals in cooperation with said metal plate; said metal plate remaining at all times out of contact with said sensor means; said sensor means comprising at least two proximity sensors each having a longitudinal axis extending perpendicularly to said diaphragm; said proximity sensors being situated at said second side of said diaphragm at different distances from said metal plate whereby said sensors each start generating said signals separately when said metal plate assumes two different predetermined positions relative to said sensors; said metal plate having a position in which said at least two proximity sensors generate said signals simultaneously.

2. An electronic pressure responsive switch as defined in claim 1, further comprising an electronic evaluating circuit means connected to said sensors for obtaining $n=2^x$, wherein n is the number of switching points of said switch and x is the number of said sensors.

3. An electronic pressure responsive switch as defined in claim 1, further comprising an electronic evaluating circuit means connected to said sensors for obtaining $n=x+1$, wherein n is the number of switching points of said switch and x is the number of said sensors; said circuit comprising a demultiplexer connected to said sensors and having outputs; amplifiers connected to said outputs and relays connected to said amplifiers.

4. An electronic pressure responsive switch as defined in claim 1, wherein each sensor has an end face; said metal plate being arranged for displacement generally perpendicularly to the end face of each said sensor; said predetermined position of said metal plate being at a predetermined distance from each said end face.

5. An electronic pressure responsive switch as defined in claim 1, in combination with a fiber tuft supply system feeding a textile machine with fiber tufts; said fiber tuft supply system comprising conduit means for conveying said fiber tufts; drive means for advancing the fiber tufts in said conduit means; said drive means including a drive motor; and a fiber tuft regulating means operatively connected to said drive motor for controlling tuft quantities supplied to said textile machine; said electronic pressure responsive switch, forming part of said fiber tuft regulating means, being connected to said conduit means and sensing the pressure therein and regulating said drive motor as a function of the pressure sensed.

6. A combination as defined in claim 5, wherein said drive motor is a pole-reversible motor.

7. A combination as defined in claim 5, wherein said drive motor is a d.c. motor.

8. A combination as defined in claim 5, wherein said drive motor is a frequency-controlled motor.

* * * * *